3,073,858
2(O-ALKYL-ALKYLPHOSPHONODITHIOYL)-
ETHYL CARBAMATES
Karoly Szabo, Yonkers, N.Y., and John G. Brady, Santa Clara, Calif., assignors to Stauffer Chemical Company, New York, N.Y., a corporation of Delaware
No Drawing. Filed Dec. 5, 1960, Ser. No. 73,551
3 Claims. (Cl. 260—461)

The present invention is concerned with certain novel phosphorus containing compounds. In particular, it is concerned with certain novel 2(O-alkyl-alkylphosphonodithioyl)ethyl carbamates, with the novel processes for preparing them, and with their use as pesticides.

The compounds of the present invention are represented by the following structural formula

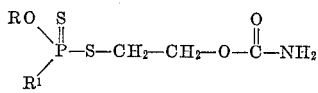

wherein R and $R^1$ are each alkyl groups having up to four carbon atoms. They are prepared by the reaction of a β-haloethyl carbamate with an O-alkyl-alkylphosphonodithioic acid. The reaction is preferably carried out in an inert solvent, for example, a hydrocarbon such as benzene, and in the presence of a basic material, such as triethylamine, capable of reacting with the hydrogen chloride produced by the reaction.

The compounds of the present invention possess outstanding activity as pesticides, particularly as insecticides and acaricides.

The following examples are given solely for the purpose of illustration and are not to be construed as limitations on the present invention, many variations of which will occur to those skilled in the art without departing from the spirit or scope of the invention.

EXAMPLE I

2(O-Ethyl-Ethylphosphonodithioyl)Ethyl Carbamate
(Compound I)

β-Chloroethylcarbamate (6.2 g.), O-ethyl-ethylphosphonodithioic acid (8.5 g.), triethylamine (5.2 g.) and benzene (60 ml.) were placed in a reaction flask equipped with thermometer and mechanical stirrer. The mixture was brought to reflux (80° C.) and kept boiling for 10 hours, when the precipitation of the triethylamine hydrochloride seemed to be completed. The triethylamine hydrochloride was removed by washing with water and the organic layer dried over $MgSO_4$.

After stripping off the solvent and by-products on reduced pressure 9 g. of a slightly viscous yellow oil was obtained. Yield 70%. The refractive index was 1.5397 at 25° C.

EXAMPLE II

2(O-Methyl-Ethylphosphonodithioyl)Ethyl Carbamate
(Compound II)

β-Chloroethyl carbamate (12.4 g.), O-methyl-ethylphosphonodithioic acid (15.6 g.), triethylamine (10.1 g.) and toluene (100 ml.) were placed in a reaction flask and the mixture was refluxed for 5 hours.

The product was separated as described in Example I, to obtain 7 g. (30% yield) of a light yellow oil. $N_D^{25}=$ 1.5506.

EXAMPLE III

The other compounds of the present invention may be prepared by procedures analogous to those given in the above examples. For example, β-bromoethyl carbamate may be used in place of β-chloroethyl carbamate and other O-alkyl-alkylphosphonodithioic acids may be used in place of those described in the above examples.

The compounds have been tested as insecticides and as acaricides according to the following methods:

*Acaricidal evaluation test.*—The two-spotted mite, *Tetranychus telarius* (Linn.) is employed in tests for acaricides. Young Pinto bean plants are infested with several hundred mites. Dispersions of test compounds are prepared by dissolving 0.1 gram of the toxic material in ten milliliters acetone. This solution is then diluted with water containing 0.015% Vatsol (a sulfonate type wetting agent) and 0.005% Methocel (methyl cellulose) as emulsifiers, the amount of water being sufficient to give concentrations of active ingredient ranging from 0.25% to 0.005%. The test suspensions are then sprayed on the infested Pinto bean plants. After seven and fourteen days, the plants are examined both for post-embryonic forms of the mite as well as eggs. The percentage of kill is determined by comparison with control plants which have not been sprayed and the LD-50 value calculated using well-known procedures. LD-50 values are reported under the columns "2 SM" and "2 SM eggs" in Table I.

*Systemic toxicity evaluation against two-spotted mites.*—Pinto bean plants in the primary leaf stage are placed in 250 ml. capacity Erlenmeyer flasks, one plant per flask. A portion of the test compound is dissolved in 10 ml. acetone. This solution is then diluted with distilled water, the amount of water being sufficient to give concentrations of active ingredient ranging from one hundred parts per million (p.p.m.) to one part per million. The final volume of test dispersion per flask is 200 ml. The treated plants are infested with several hundred two-spotted mites, *Tetranychus telarius* (Linn.).

After seven and fourteen days, the plants are examined both for post-embryonic forms of the mite as well as eggs. The percentage of kill is determined by comparison with control plants which have been placed in distilled water only. Again, the LD-50 value is calculated and reported under the column "2 SM Systemic" in Table 1.

*Insecticidal evaluation tests.*—Four insect species are subjected to evaluation tests for insecticides:

(1) American cockroach (AR), *Periplaneta americana* (Linn.)
(2) Large milkweed bug (MWB), *Oncopeltus fasciatus* (Dallas)
(3) Confused flour beetle (CFB), *Tribolium confusum* (Duval)
(4) House fly (HF), *Musca domestica* (Linn.)

The procedure for insects is similar to the miticidal testing procedure. Test insects are caged in cardboard mailing tubes 3⅛" in diameter and 2⅝" tall. The cages are supplied with cellophane bottoms and screened tops. Ten to twenty-five insects are used per cage. Food and water are supplied in each cage. The confused flour beetles are confined in petri dishes without food. The caged insects are sprayed with the active compound in various concentrations. After twenty-four and seventy-two hours, counts are made to determine living and dead insects.

House fly evaluation tests differ in this respect: the toxicant is dissolved in a volatile solvent, preferably acetone, the active compound is pipetted into a petri dish bottom, allowed to air dry and placed in a cardboard mailing tube. Twenty-five female flies are caged in the tube. The flies are continuously exposed to the known residue of the active compound in the cage. After twenty-four and forty-eight hours, counts are made to determine living and dead insects. The LD-50 values are calculated using well known procedures, and reported in Table I below.

TABLE I—APPROXIMATE LD50 VALUES

| Compound | HF, μg | AR | MWB | CFB | 2SM | 2SM Eggs | 2SM Systemic p.p.m. |
|---|---|---|---|---|---|---|---|
| I | 10 | <0.05 >0.01 | <0.02 >0.01 | <10 μg >1 μg | <0.06 | <0.06 | <1 |
| II | 10 | <0.05 >0.01 | 0.05 | 0.1–100% | 0.12–100% | 0.12–100% | |

What is claimed is:

1. As a novel composition of matter, a compound having the formula

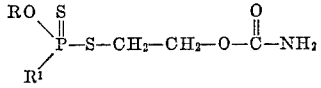

wherein R and $R^1$ are each alkyl groups having up to four carbon atoms.

2. 2(O-ethyl-ethylphosphonodithioyl)ethyl carbamate.
3. 2(O-methyl-ethylphosphonodithioyl)ethyl carbamate.

References Cited in the file of this patent
UNITED STATES PATENTS 2,998,347    Fancher et al.    Aug. 29, 1961
3,008,977    Schrader    Nov. 14, 1961